(12) United States Patent
Ius et al.

(10) Patent No.: US 9,150,995 B2
(45) Date of Patent: Oct. 6, 2015

(54) LAUNDRY MACHINE WITH LIGHTING APPARATUS FOR DRUM LIGHTING

(71) Applicant: Electrolux Home Products Corporation N.V., Brussels (BE)

(72) Inventors: Nicola Ius, Zoppola (IT); Walter Cerrato, Porcia (IT)

(73) Assignee: Electrolux Home Products Corporation N.V., Brussels (BE)

( * ) Notice: Subject to any disclaimer, the term of this patent is extended or adjusted under 35 U.S.C. 154(b) by 0 days.

(21) Appl. No.: 14/365,766

(22) PCT Filed: Dec. 13, 2012

(86) PCT No.: PCT/EP2012/075340
§ 371 (c)(1),
(2) Date: Jun. 16, 2014

(87) PCT Pub. No.: WO2013/087750
PCT Pub. Date: Jun. 20, 2013

(65) Prior Publication Data
US 2014/0355247 A1    Dec. 4, 2014

(30) Foreign Application Priority Data
Dec. 16, 2011  (EP) .................................... 11193991

(51) Int. Cl.
| | |
|---|---|
| *F21V 33/00* | (2006.01) |
| *D06F 37/26* | (2006.01) |
| *F21V 23/02* | (2006.01) |
| *D06F 58/04* | (2006.01) |
| *D06F 39/00* | (2006.01) |

(52) U.S. Cl.
CPC .............. *D06F 37/267* (2013.01); *D06F 37/26* (2013.01); *D06F 39/00* (2013.01); *D06F 58/04* (2013.01); *F21V 23/02* (2013.01); *F21V 33/0044* (2013.01)

(58) Field of Classification Search
CPC ................................. D06F 58/02; D06F 58/04
USPC ........................................................... 362/89
See application file for complete search history.

(56) References Cited

FOREIGN PATENT DOCUMENTS

| | | |
|---|---|---|
| DE | 1051234 B | 2/1959 |
| DE | 10316377 B3 | 9/2004 |
| DE | 102010015849 B3 | 4/2011 |
| EP | 2094899 B1 | 11/2009 |
| JP | 2007-175287 | 7/2007 |
| JP | 2008-132257 | 6/2008 |
| KR | 20080032372 | 4/2008 |

OTHER PUBLICATIONS

International Search Report mailed May 7, 2013 in corresponding International Application No. PCT/EP2012/075340.

*Primary Examiner* — Vip Patel
(74) *Attorney, Agent, or Firm* — Banner & Witcoff, Ltd.

(57) ABSTRACT

A laundry machine (100) is proposed. The laundry machine includes a drum (115) for housing the laundry to be treated, an encasing portion (105,120) for encasing the drum (115), and a lighting apparatus (245) for illuminating the inside of the drum (115). The lighting apparatus (245) includes one or more lighting devices (250) associated to the drum (115), and a power feeding assembly for power supplying said one or more lighting device (250). In the solution according to one or more embodiments of the present invention, the power feeding assembly includes an electro-magnetic apparatus (265) arranged for power supplying, at least partially contactless, said one or more lighting devices (250).

14 Claims, 4 Drawing Sheets

LAUNDRY MACHINE WITH LIGHTING APPARATUS FOR DRUM LIGHTING

FIELD OF THE INVENTION

The present invention generally relates to laundry machines, such as front/top loading washing machines, washers/dryers, or dryers, both for domestic and professional use. More particularly, the present invention relates to drum lighting for such laundry machines.

BACKGROUND OF THE INVENTION

Each household and professional laundry machine (hereinafter, machine, for the sake of conciseness)—such as washing machine, washer/dryer, dryer typically comprises, among other components, an inner compartment (including a, e.g. rotating, housing drum or simply drum) that can be accessed by a user for loading the laundry to be treated (e.g., to be washed and/or dried) and unloading the laundry after the intended treatment has been accomplished.

As known, such machines, whether of the front loading type or of the top loading type, are such that some drum areas are scarcely visible for the user when accessing the drum during loading/unloading operations of the laundry, which makes such loading/unloading operations difficult, and hence prone to errors, or even dangerous for the user. In fact, when experiencing low visibility conditions within the drum, the user may be compelled to uncomfortably reach deep into the drum, e.g., for ascertaining a correct loading of the laundry (for instance, an even distribution of the laundry before the beginning of the treatment thereof) and/or a complete unloading of the laundry (for instance, so as to avoid laundry from being unintentionally left or forgotten within the drum at the end of the treatment thereof), which also exposes the user to injury.

Moreover, for machines wherein the drum is visible from the external during operation thereof (e.g. by see-through members, such as a glass porthole), it could be convenient for the user to have the drum illuminated during the treatment of the laundry, so as to be able to at least roughly ascertain the correctness of the treatment (e.g. by visibly and directly checking whether some treatment phases, such as soaping, rinsing and the like actually take place or not).

In order to meet such requirements, some of last-generation machines are provided with a lighting apparatus, the latter substantially comprising one or more lighting devices—such as halogen, incandescent or LED ("Light Emitting Diode") lamps—acting as corresponding light sources for illuminating the drum, and a power feeding assembly—including electronic circuitry, such as rectifiers and controllers, and electrical wires—for generally feeding an operative electric power (from a power source of the machine) to each lighting device for energization thereof.

Most of solutions known in the art, in particular most of front-loading washing machines, use a substantially common approach according to which the lighting devices are arranged at a position of the machine outside the drum, with each lighting device properly oriented towards the access opening of the drum for allowing the emitted light to illuminate as much drum area as possible.

Another approach on which other solutions are based provides that the lighting devices are arranged within the drum. For example, EP 2 094 899 B1 relates to a washer/dryer comprising a drum wherein the laundry is placed, at least one drum baffle disposed in the drum for turning over and tumbling the laundry, and one or more light sources disposed inside the drum baffle for illuminating the interior of the drum by transmitting light from inside the drum baffles towards the outside.

SUMMARY OF INVENTION

The Applicant has realized that the known solutions are not satisfactory for modern technological requirements.

In fact, according to the Applicant, the approach providing the lighting devices outside the drum is not effective for most of nowadays machines. This is substantially due to natural decrease of light intensity emitted by the lighting devices with the increase of distance (between the lighting device itself and the drum areas to be illuminated, in the case at issue), which involves firstly that often the lighting devices are not able to provide enough light for sufficiently illuminating the whole drum—thereby leaving not-illuminated drum areas, and secondly that a large percentage of the emitted light (and hence energy) is wasted.

Such drawback is exacerbated by the fact that, in order to meet users' requirements, the drum of most of modern machines has increased size for ensuring the required high laundry-capacity, which has repercussions on energy consumption, reliability and complexity aspects of the lighting apparatus.

In fact, in such condition, a greater number of lighting devices or lighting devices having greater power of electromagnetic radiation would be useful for good illumination, which unavoidably involves an increase in energy consumption typically not compatible with the energy saving parameters to be met by the machines. In turn, such increase in power would cause an increase in operating temperatures of the lighting device(s), which is typically faced and tried to solve by means of further and relatively complex electronic circuits apt to prevent overheating and risks of fire (e.g. by controlling the operative electric power fed to the lighting device(s) as a function of the temperature thereof), thus making the whole lighting apparatus more complex and less reliable.

The Applicant has recognized that the known approach of providing the lighting device within the drum is intrinsically difficult to implement—substantially due to the fact that the lighting device, arranged within a part of the machine (i.e. the rotating drum) that is movable with respect to a fixed part thereof (e.g. cabinet, tub and top lid encasing the drum, which are not integral with the latter), is not easily electrically connectable with the power source of the machine (not integral with the rotation of the drum)—and that the known solutions making use of such approach are not satisfactory.

For example, as far as the document EP 2 094 899 B1 is concerned, the Applicant believes that the solution disclosed in such document, as based on transmitting the operative electric power to the lighting devices (i.e. the light sources) from the power source by means of a slip ring assembly, is not efficient in terms of complexity, easy of working, reliability and safety. In fact, the slip ring assembly is configured to transfer electric power from a stationary unit (such as a graphite or metal contact—brush—placed at, e.g. the tub encasing the drum) to a rotating unit (such as a metal ring placed at, e.g. the drum), by means of rubbing or touching of the brush on the metal ring that allows the electric power to be conducted between the (stationary) unit outside of the drum and the (rotating) unit inside of the drum. However, the Applicant has found that the rubbing between brush and metal ring according to drum speed exposes such components to mechanical stress, which may easily cause wearing effects and hence require replacement thereof or other setting operations (such as re-alignment between brush and metal ring) even after a relatively low period of use of the machine, as well as electrical stress, which unavoidably raises electrical safety matters for the user.

The Applicant has tackled the problem of devising a satisfactory solution able to overcome the above-discussed drawbacks, thereby aiming at effectively, reliably and easily illuminating the internal of the drum.

In its general terms, the solution according to one or more embodiments of the invention is based on the idea of contactless power supplying each lighting device from the outside of the drum.

The present invention relates to a laundry machine comprising a drum for housing the laundry to be treated, an encasing portion for encasing the drum, and a lighting apparatus for illuminating the inside of the drum. The lighting apparatus comprises one or more lighting devices associated to the drum, and a power feeding assembly for power supplying said one or more lighting devices. In the solution according to one or more embodiments of the present invention, the power feeding assembly comprises an electromagnetic apparatus arranged for power supplying, at least partially contactless, said one or more lighting devices.

Preferably, the drum is configured for rotating with respect to the encasing portion, hence the electromagnetic apparatus may be configured for at least partially contactless transferring an electric power coming from a power source of the machine by electromagnetic coupling between at least one transmitting device associated to said encasing portion and at least one receiving device associated to said drum, with each lighting device that can be energized according to said contactless, electromagnetically transferred electric power.

The electromagnetic apparatus may advantageously comprise said at least one transmitting device associated with the encasing portion and preferably electrically connected to the power source of the machine, and said at least one receiving device associated with the drum, each one being connected to a corresponding lighting device. In an embodiment of the invention, the at least one transmitting device is configured for electromagnetically transmitting a first electric power from the power source, and the at least one receiving device is configured for contactless receiving a second electric power corresponding to said electromagnetically transmitted first electric power, with each lighting device that is energized according to said second electric power.

Advantageously, the at least one transmitting device may comprise at least one transmitting coil element for electromagnetically transmitting the first electric power, and the at least one receiving device may comprises at least one receiving coil element for contactless receiving the second electric power when the at least one transmitting coil element and the at least one receiving device are in an electromagnetic coupling condition for which an electromagnetic field corresponding to the transmitting first electric power is at least partly intercepted by the at least one receiving coil element.

The at least one receiving device may further comprise electronic conversion circuitry electrically coupled to the corresponding at least one receiving coil element for receiving the second electric power therefrom; thus, the electronic conversion circuitry may be configured to convert the second electric power into an operative electric power to be provided to the at least one lighting device for energization thereof.

Moreover, the at least one receiving device may comprise at least one power accumulation element electrically coupled with the electronic conversion circuitry for accumulating the operative electric power to be provided to the each lighting device.

Preferably, although not necessarily, the laundry machine comprises at least one drum lifter extending from an inner surface of the drum towards the inside of the drum for turning over and tumbling the laundry during operation of the machine, with each lighting device that can be advantageously associated with a corresponding one of the at least one drum lifter.

In a not limiting configuration, the at least one drum lifter is fixed to the inner surface of the drum, and is provided with an exposed surface substantially opposite the inner surface of the drum and directed towards the inside of the drum, with each lighting device fixed internally to said lifter. In this respect, the at least one drum lifter may be at least partially made of transparent material for the passage of the light; alternatively, it can made of an opaque material and may comprises one or more holes or openings for the passage of the light.

In an alternative embodiment, the at least one drum lifter may be fixed to the inner surface of the drum, and may be provided with an exposed surface substantially opposite the inner surface of the drum and directed towards the inside of the drum, with each lighting device that may be fixed to said exposed surface or to a corresponding recess of the exposed surface of a respective drum lifter.

In order to cover a corresponding lighting device and preventing the laundry to come in contact with it during operation of the machine, the at least one drum lifter may comprise at least one covering element, e.g. at least partially made of transparent material. Additionally or alternatively, the at least one covering element and/or the at least one drum lifter can be made of an opaque material and comprise one or more holes for the passage of the light.

Without losing of generality, the at least one lighting device may comprise one or more among incandescent lamps, electroluminescent lamps, LEDs and gas discharge lamps.

Another aspect of the solution according to one or more embodiments of the present invention relates to a method for illuminating the inside of a drum of a laundry machine.

Thanks to the present invention, the lighting devices may be arranged within the drum (with the emitted light that is thus able to properly illuminate the drum substantially without dispersion phenomena and without energy wasting) and energized from the power source of the machine easily (i.e., with a lower number of components), reliably (i.e., without subjecting the components to mechanical stress) and safely (i.e., without subjecting the components to electrical stress that may impair electrical safety for the user).

BRIEF DESCRIPTION OF THE ANNEXED DRAWINGS

The solution according to one or more embodiments of the invention, as well as further features and the advantages thereof, will be best understood with reference to the following detailed description, given purely by way of a non-restrictive indication, to be read in conjunction with the accompanying drawings (wherein corresponding elements are denoted with equal or similar references, and their explanation is not repeated for the sake of exposition brevity). In this respect, it is expressly understood that the figures are not necessarily drawn to scale (with some details that may be exaggerated and/or simplified) and that, unless otherwise indicated, they are simply used to conceptually illustrate the described structures and procedures. In particular.

DETAILED DESCRIPTION OF PREFERRED EMBODIMENTS OF THE INVENTION

Figure 1:
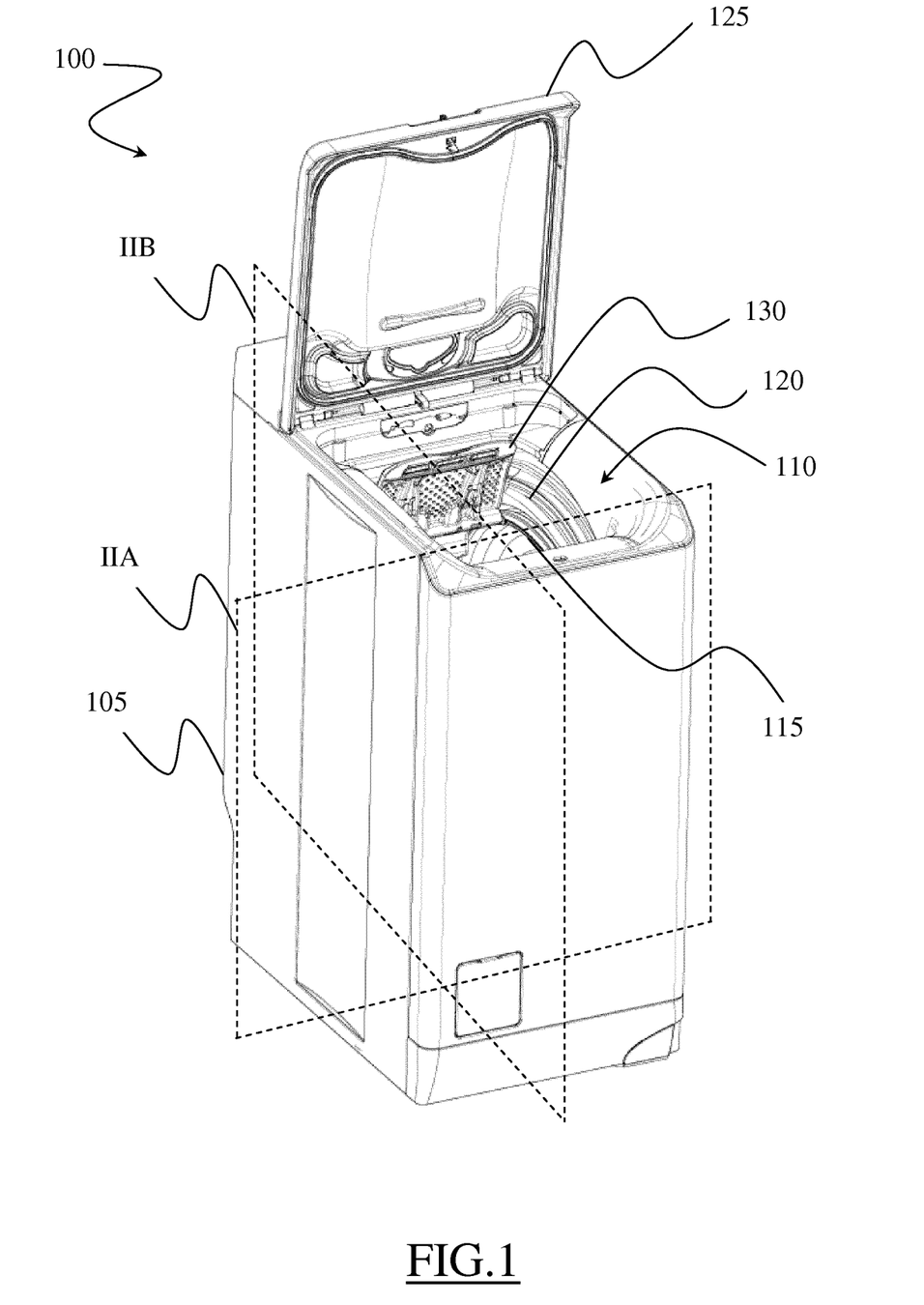
FIG. 1 shows a perspective view of a laundry machine according to an embodiment of the present invention.

Referring now to the drawings, FIG. 1 schematically shows a perspective view of a laundry machine 100 (or simply machine), for example for domestic or professional use, according to an embodiment of the present invention. The machine 100 may for example be a washing machine (as exemplarily illustrated in the figure, and to which reference will be made in the following by way of a non-limiting example only), a dryer, or a washer/dryer, either of the top loading type (as exemplarily depicted in the figure) or of the front loading type.

The machine 100 preferably comprises a preferably substantially parallelepiped-shaped cabinet 105, which encloses an inner compartment 110 apt to accommodate a, e.g. rotating, drum 115 for housing the laundry to be treated (e.g., washed and/or dried), a tub 120 encasing the drum 115, and an access lid 125 (provided, in the example illustrated in the enclosed figures, on top of the cabinet 105) and preferably door flaps 130 (preferably integrated in the drum 115), both shown in an open configuration, for accessing the drum 115 thereby allowing loading/unloading operations of the laundry by a user.

As known, the machine 100 may comprise various components (not shown) for operation thereof, such as electro-mechanical components (e.g. motor and solenoid valves for causing the drum 115 to rotate), electro-hydraulic components (e.g. valves for causing the treatment fluids to be loaded and discharged during the washing/drying cycle), and electric components (e.g., for drum lighting and/or water or cleaning solution heating). However, for the sake of conciseness and clarity, in the following only relevant components directly or indirectly involved in drum lighting will be discussed.

As described in the introductory part of this description, a difficult task to face is how to simply, reliably and effectively illuminate the drum 115, especially when lighting devices are required to be inside the drum 115 for illuminating as much drum areas as possible, and are to be energized from a power source of the machine 100 (e.g. an AC electric power supply provided by the mains), not shown, outside the machine 100 (hence, not integral with the drum 115).

In fact, as known, the drum 115 is configured to rotate with respect to an encasing portion (e.g. including the cabinet 105 and/or the tub 120, and/or other portions associated or integral thereto, such as the lid 125) 100 of the machine, that during operation of the machine 100 encases the drum 115.

The relevant components involved in drum lighting are housed within the machine 100, and are not visible in FIG. 1. For such reason, hereinafter such figure will be discussed together with FIGS. 2A and 2B, which schematically show corresponding sectional views, along the section planes IIA and IIB of FIG. 1, respectively, of the machine 100, and with FIG. 2C, the latter schematically showing a close-up view of FIG. 2B.

Figure 2A:
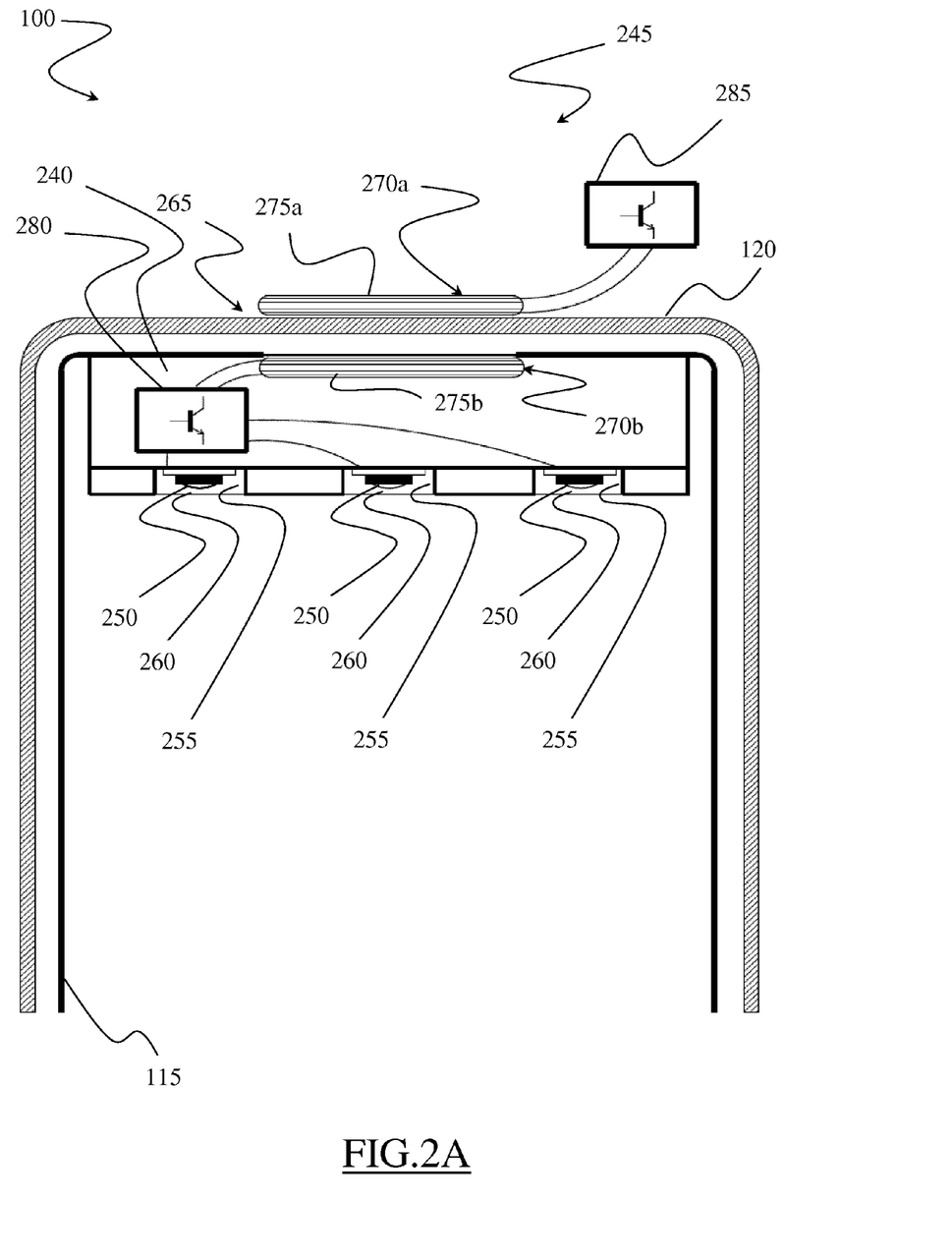
FIGS. 2A and 2B schematically show corresponding sectional views, along the section planes IIA and IIB, of the same laundry machine, in which for the sake of clarity some components have not been represented, and FIG. 2C schematically shows a close-up view of FIG. 2B.
Figure 2B:
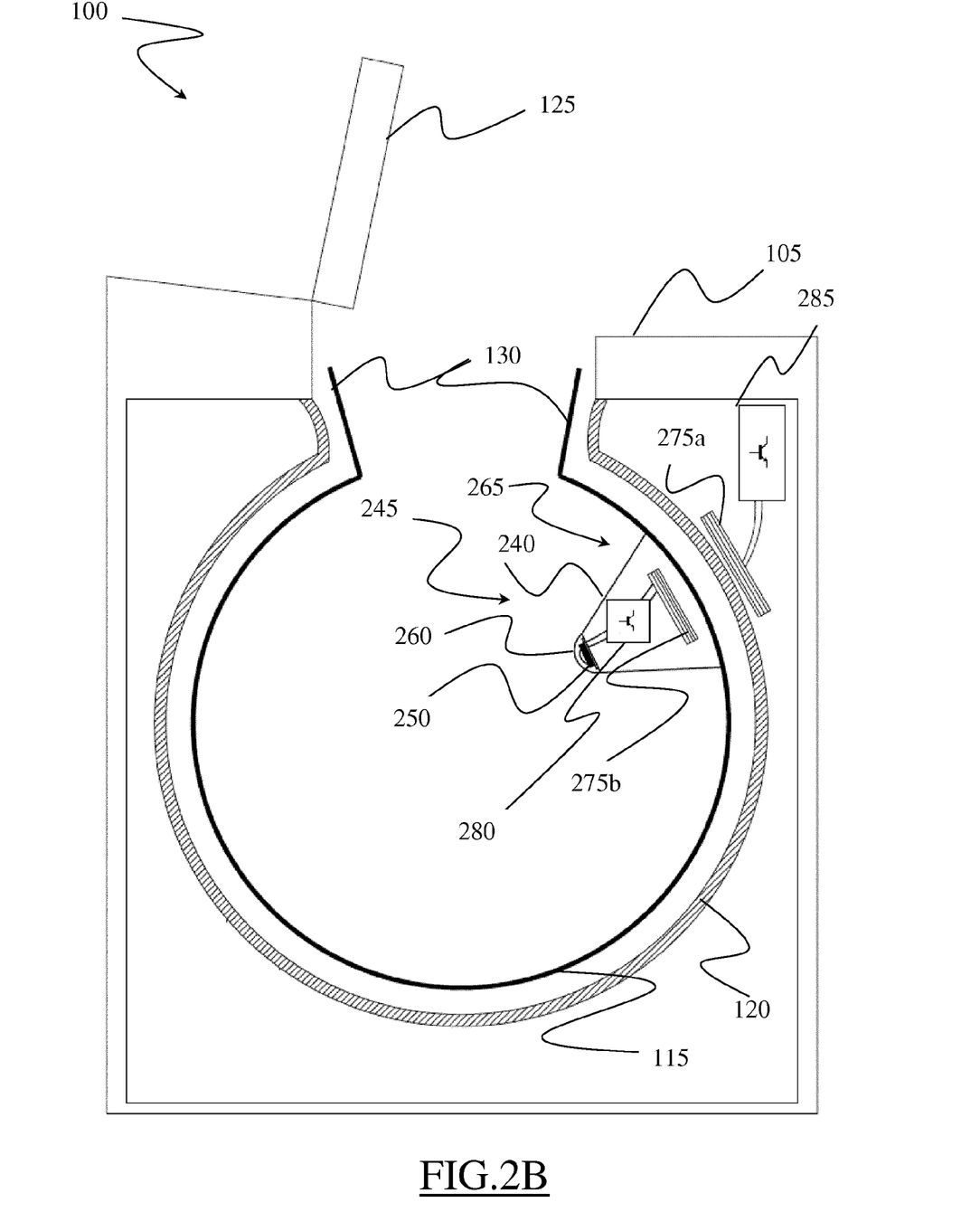
Figure 2C:
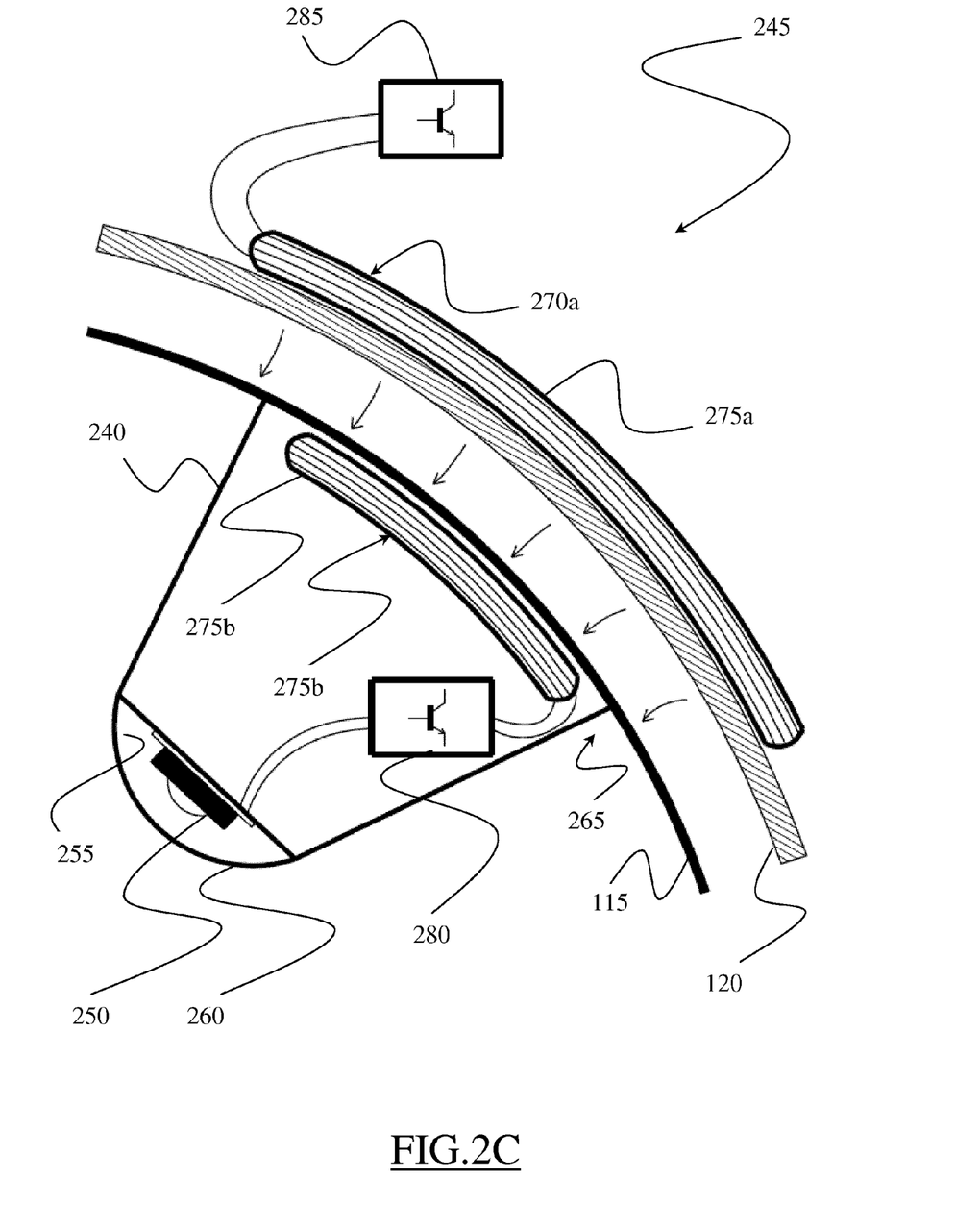

The machine 100 may comprise one (as illustrated in the figures) or more drum lifters, such as the drum lifter 240, which extends towards the inside of the drum 115 for performing turning over and tumbling of the laundry (not shown) during operation of the machine 100, and which is also adapted to house part of a lighting apparatus (as discussed below). Preferably, although not necessarily, the drum lifter 240, exemplarily shown as substantially hollow truncated pyramid-shaped, is adapted to be fixed to (a contact portion of) an inner surface of the drum 115, and has a free or exposed surface opposite the (contact portion of) inner surface directed towards the inside of the drum 115.

The machine 100 further comprises a lighting apparatus 245 for illuminating the inside of the drum 115. The lighting apparatus 245 comprises one ore more (three, in the example at issue, as visible in FIG. 2A) lighting devices 250, such as incandescent lamps, electroluminescent lamps (e.g. LED lamps, as exemplarily depicted in the figures), which are generally associated with the drum 115 (preferably arranged within the drum 115, more preferably associated with corresponding drum lifters 240, and even more preferably fixed inside corresponding drum lifters 240, as exemplary disclosed in the figure) and are configured to be properly energized for generating light for illuminating the drum 115.

Without departing from the scope of the invention, the lighting devices 250 may be fixed in any manner to a drum lifter 240, for instance within it (e.g., to any inner wall thereof) and/or outside it (e.g., to any outer wall thereof, like the free surface). For example, the lighting devices 250 may be watertight fixed directly on the free surface of the drum lifter 240 (such as to be exposed therefrom), or, as in the exemplary and not limiting disclosed embodiment, they may be mounted by any fixing technique to corresponding recesses 255 at the free surface of the drum lifter 240 (e.g., with each one that houses a corresponding lighting device 250), and preferably, but not necessarily, covered by corresponding covering elements 260 for preventing the laundry to come in direct contact with the lighting devices 250 during operation of the machine 100. Without losing of generality, and without affecting the principles of the present invention, the covering elements 260 can be made of a transparent material (as exemplarily assumed and illustrated) for allowing the light emitted from the lighting devices 250 to be transmitted towards the inside of the drum 115. In an alternative embodiment, not shown, the covering elements 260 can be made of an opaque material and may comprise one or more holes that allow the light emitted from the lighting device 250 to be transmitted towards the inside of the drum 115. Additionally or alternatively, at least part of the drum lifters 240 (e.g., those possibly housing lighting devices 250 at their inside) can be made of a transparent material.

The lighting apparatus 245 further comprises a power feeding assembly for power supplying each lighting device 250, e.g. for feeding it with an operative electric power (advantageously, but not necessarily, different from that of the power source) required for energization thereof.

Broadly speaking, in the solution according to one or more embodiments of the present invention, the power feeding assembly of the machine 100 comprises an electromagnetic apparatus 265, preferably associated (e.g. installed, integral, fixed to) partly with the drum 115 and partly with the encasing portion (including, among the others, the cabinet 105 and, in the case of a washing machine or of a washer/drier, the tub 120) for power supplying each lighting device 250 at least partly contactless.

In the present application "at least partly a contactless (or wireless)" means that the path of the electric power from the power source of the machine 100 to the lighting device 250 comprises at least a part (or portion) in which electric power is transmitted as an electromagnetic wave, and therefore without a "mechanical support" (i.e. an electric cable or wire). The path of electric power from the power source of the machine 100 to the lighting device 250 may comprise one or more electric cables, or wires, or other electric or electronic components in which electric power flows, but it comprises at least a part in which electric power flows only as an electromagnetic wave.

In the exemplary disclosed embodiment, the electromagnetic apparatus 265 is configured for at least partially contactless transferring an electric power from the power source of the machine 100 between a transmitting device 270a associated with (e.g. installed in, integral with, fixed to) the encasing portion 105,120 and one or more receiving devices associated with (e.g. installed in, integral with, fixed to) the drum 115 by electromagnetic coupling; as will be discussed in the following, each lighting device 250 is energized (e.g., provided with the operative electric power) according to said contactless electromagnetically transferred electric power.

Preferably, the electromagnetic apparatus 265 comprises one or more transmitting devices associated with (e.g. installed in, integral with, fixed to) the encasing portion 105, 120 (i.e. outside the drum 115, and, in case of a washing machine or washer/dryer, preferably at the tub 120), such as the transmitting device 270a, and one or more receiving devices associated with (e.g. installed in, integral with, fixed to) the drum 115 (preferably arranged within the drum 115, and more preferably, as herein exemplarily illustrated, arranged within corresponding drum lifters 240), such as the receiving device 270b.

According to the disclosed embodiment of the invention, the transmitting device 270a is electrically connected to the power source of the machine 100 (not visible), whereas the (or each) receiving device 270b is electrically connected to corresponding lighting devices 250, with the transmitting device 270a and the receiving device 270b that are electromagnetically coupled or adapted to be coupled with each other. In this respect, the transmitting device 270a is configured for electromagnetically transmitting (as schematically depicted in FIG. 2C by means of arrows between the drum 115 and the tub 120) a primary electric power from the power source (i.e., the electric power from the power source or a predefined part thereof), whereas the receiving device 270b is configured for contactless receiving a secondary electric power corresponding to the transmitted primary electric power (clearly the secondary electric power may coincide with—i.e., be the same as—the primary electric power), each lighting device 250 being energized (e.g., provided with the operative electric power) according to the received secondary electric power.

In a preferred, not limiting embodiment of the present invention, contactless electrical power transfer between the transmitting device 270a and the receiving device 270b may occur by means of one or more transmitting coil elements, such as the exemplary coil element 275a of the transmitting device 270a, and by means of one or more receiving coil elements, such as the coil element 275b of the receiving device, respectively. For example, the coil elements 275a and 275b may comprise a conductive (primary and secondary, respectively) winding; in this way, according to well known principles of mutual induction, when the coil elements 275a and 275b experience an electromagnetic coupling condition wherein an electromagnetic field generated by the coil element 275a and corresponding to the transmitting primary electric power is at least partly intercepted by the coil element 275b, the primary electric power in the primary winding induces the secondary electric power in the secondary winding (with the ratio of the primary electric power to the secondary electric power that may be set according to the ratio of the number of turns in the primary winding to the number of turns in the secondary winding).

Clearly, according to present invention, the electromagnetic coupling between the transmitting device 270a and the receiving device 270b may occur both when the drum is still and when the drum is rotating.

Preferably, the receiving device 270b further comprises electronic conversion circuitry 280 (schematically depicted only in the FIGS. 2A and 2C by a generic electronic component), which is electrically connected to the coil element 275b for receiving the secondary electric power therefrom and providing the operative electric power. Without losing of generality, the electronic conversion circuitry 280 may be a rectifier (e.g. implemented by vacuum tube diodes, mercury arc valves, solid state diodes, silicon-controlled rectifiers and other silicon-based semiconductor switches) for converting the secondary electric power (i.e. an AC electric power) into the operative electric power to be provided to the lighting devices 250 (i.e. a DC electric power) for energization thereof. Analogously, the transmitting device 270a further comprises processing electronic circuitry 285 (schematically depicted in the figures by the same generic electronic component as the electronic conversion circuitry 280), which in general may accomplish to different functions (such as management of the electric power provided by the power source, e.g., by taking all or part of it in response to a user command).

In a particularly advantageous embodiment of the present invention, best visible in FIG. 2B, referred to a horizontal-axis top loading washing machine, the transmitting device 270a (outside the drum 115—and in this example also outside the tub 120), and the receiving device 270b (hence, the drum lifter 240 housing it) are arranged such as the corresponding coil elements 275a and 275b are in a full electromagnetic coupling condition (wherein the coil elements 275a and 275b, as substantially facing to each other, provide maximum electric power transfer) when the lid 125 is opened, and the drum 115, not rotating, is in the (only) position that allows the flap doors 130 to be opened. In such way, during loading and unloading operations of the laundry, the lighting devices 250 are properly energized for very good illumination of the (inside of the) drum 115.

Thanks to the present invention, the lighting devices 250 may be arranged within the drum 115, and therefore the light emitted therefrom can illuminate the drum 115 in an effective way and substantially without dispersion and energy wasting phenomena (e.g., with respect to a configuration wherein the lighting devices are arranged outside the drum). This has been achieved by a power feeding assembly for energizing the lighting devices from the power source of the machine that has a low number of components, and that does not subject the components to mechanical or electrical stress.

The above described configuration, although preferable, has not to be construed limitatively. In this respect, in one of the possible embodiments of the present invention, not shown, the receiving device 270b may further comprise one or more power accumulation elements for accumulating part or all of the operative electric power from the electronic conversion circuitry 280. In this regard, the lighting devices 250 may be electrically connected with the power accumulation elements, the electronic conversion circuitry 280 or both of them. In such way, during operation of the machine 100, and particularly during rotation of the drum 115, the power accumulation elements may accumulate the operative electric power (as above discussed) each time the electromagnetic coupling condition occurs (i.e., at each rotation of the drum 115), and feed the accumulated operative electric power even also the drum 115 is rotating and/or the position of the drum lifter 240 does not cause the coil element 275b to be aligned with the coil element 275a in the opened configuration of the lid 125 and of the flap doors 130. As should be understood, such embodiment is preferred, although not exclusively, in case the machine 100 has more drum lifters 240, each one having a corresponding receiving device 270b and corresponding lighting devices 250, and only one transmitting device 270a. Moreover, such embodiment may advantageously be used for machines wherein the drum is visible from the external during operation thereof (e.g., by see-through members, such as a glass porthole in front-loading machines); in fact, in this way the user has the drum illuminated during the treatment of the laundry (including during the rotation of the drum), and is able to at least roughly ascertain the correctness of the treatment (e.g., by visibly and directly checking whether some treatment phases, such as soaping, rinsing and the like actually take place or not).

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details (such as the numeric examples) set forth in the preceding description for providing a more thorough understanding thereof; on the contrary, well known features may have been omitted or simplified in order not to obscure the description with unnecessary particulars. Moreover, it is expressly intended that specific elements and/or method steps described in connection with any disclosed embodiment of the invention may be incorporated in any other embodiment as a matter of general design choice.

For example, analogous considerations apply if the machine has a different structure or includes equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

For example, the type, material and number of lighting devices illustrated in the present description has not to be construed limitatively, since many implementations, all falling within the same principle of contactless powering/energizing lighting device(s) within the drum from a power source outside the drum by electromagnetic coupling, are possible. For instance, many receiving devices can be provided, with each one of the receiving devices that can be electrically connected (or coupled) to a single lighting device or to a corresponding set of lighting devices.

The invention claimed is:

1. A laundry machine comprising:
a drum for housing laundry to be treated;
an encasing portion for encasing the drum; and
a lighting apparatus for illuminating an inside of the drum, the lighting apparatus comprising:
one or more lighting devices associated to the drum; and
a power feeding assembly for power supplying said one or more lighting devices, wherein
the power feeding assembly comprises an electromagnetic apparatus arranged for power supplying, at least partially contactless, said one or more lighting devices.

2. The laundry machine according to claim 1, wherein
the drum is configured for rotating with respect to the encasing portion,
the electromagnetic apparatus is configured for at least partially contactless transferring an electric power coming from a power source of the machine by electromagnetic coupling between at least one transmitting device associated to said encasing portion and at least one receiving device associated to said drum, and
each lighting device is being energized according to said contactless, electromagnetically transferred electric power.

3. The laundry machine according to claim 2, wherein the electromagnetic apparatus comprises:
said at least one transmitting device associated with the encasing portion, the at least one transmitting device being electrically connected to the power source of the machine; and
said at least one receiving device associated with the drum, each one of the at least one receiving device being connected to a corresponding lighting device, and
wherein
the at least one transmitting device is configured for electromagnetically transmitting a first electric power from the power source, and the at least one receiving device is configured for contactless receiving a second electric power corresponding to said electromagnetically transmitted first electric power, each lighting device being energized according to said second electric power.

4. The laundry machine according to claim 3, wherein at least one transmitting device comprises at least one transmitting coil element for electromagnetically transmitting the first electric power, and the at least one receiving device comprises at least one receiving coil element for contactless receiving the second electric power when the at least one transmitting coil element and the at least one receiving device are in an electromagnetic coupling condition for which an electromagnetic field corresponding to the transmitting first electric power is at least partly intercepted by the at least one receiving coil element.

5. The laundry machine according to claim 4, wherein the at least one receiving device further comprises electronic conversion circuitry electrically coupled to the corresponding at least one receiving coil element for receiving the second electric power therefrom, said electronic conversion circuitry being configured to convert the second electric power into an operative electric power to be provided to the at least one lighting device for energization thereof.

6. The laundry machine according to claim 5, wherein the at least one receiving device further comprises at least one power accumulation element electrically coupled with the electronic conversion circuitry for accumulating the operative electric power to be provided to the each lighting device.

7. The laundry machine according to claim 1, wherein the laundry machine further comprises at least one drum lifter extending from an inner surface of the drum towards the inside of the drum for turning over and tumbling laundry during operation of the laundry machine, and each lighting device is associated with a corresponding one of the at least one drum lifter.

8. The laundry machine according to claim 7, wherein the at least one drum lifter is fixed to the inner surface of the drum, and is provided with an exposed surface substantially opposite the inner surface of the drum and directed towards the inside of the drum, and each lighting device is fixed internally to said lifter.

9. The laundry machine according to claim 8, wherein the at least one drum lifter is at least partially made of at least one of transparent material, and an opaque material that comprises one or more holes or openings for passage of light therethrough.

10. The laundry machine according to claim 7, wherein the at least one drum lifter is fixed to the inner surface of the drum, and is provided with an exposed surface substantially opposite the inner surface of the drum and directed towards the inside of the drum, and each lighting device is fixed to said exposed surface or to a corresponding recess of the exposed surface of a respective drum lifter.

11. The laundry machine according to claim 10, wherein the at least one drum lifter comprises at least one covering element for covering a corresponding lighting device and preventing the laundry to come in contact with the lighting device during operation of the machine.

12. The laundry machine according to claim 11, wherein the at least one covering element and/or the at least one drum lifter is at least partially made of at least one of transparent material and is made of an opaque material that comprises one or more holes for passage of light therethrough.

13. The laundry machine according to claim 1, wherein at least one lighting device comprises at least one incandescent lamps, electroluminescent lamps, LEDs, and gas discharge lamps.

14. A method for illuminating an inside of a drum laundry machine, comprising:
    a drum for housing laundry to be treated;
    an encasing portion for encasing the drum; and
    a lighting apparatus for illuminating the inside of the drum, the lighting apparatus comprising:
        one or more lighting devices associated to the drum, and
        a power feeding assembly for power supplying each lighting device,
    wherein the method comprises:
    providing the power feeding assembly with an electromagnetic apparatus for power supplying each lighting device at least partially contactless.

\* \* \* \* \*